(12) United States Patent  
Sakabe

(10) Patent No.: US 11,642,829 B2  
(45) Date of Patent: May 9, 2023

(54) PITCH CHANGING DEVICE, AND MOLDING DEVICE PROVIDED WITH SAME AND MOLDING METHOD

(71) Applicant: NISSEI ASB MACHINE CO., LTD., Nagano (JP)

(72) Inventor: Yuji Sakabe, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 130 days.

(21) Appl. No.: 17/255,804

(22) PCT Filed: Jun. 26, 2019

(86) PCT No.: PCT/JP2019/025310  
§ 371 (c)(1),  
(2) Date: Dec. 23, 2020

(87) PCT Pub. No.: WO2020/004441  
PCT Pub. Date: Jan. 2, 2020

(65) Prior Publication Data  
US 2021/0268714 A1 Sep. 2, 2021

(30) Foreign Application Priority Data

Jun. 29, 2018 (JP) .............................. JP2018-125212

(51) Int. Cl.  
*B29C 49/42* (2006.01)  
*B29C 49/06* (2006.01)  
*B29L 31/00* (2006.01)

(52) U.S. Cl.  
CPC ...... *B29C 49/42122* (2022.05); *B29C 49/064* (2013.01); *B29L 2031/712* (2013.01)

(58) Field of Classification Search  
CPC . B29C 49/42122; B29C 49/064; B29C 49/02; B29C 49/06; B29C 49/78; B29C 2049/023; B29L 2031/712  
See application file for complete search history.

(56) References Cited

U.S. PATENT DOCUMENTS 6,156,258 A   12/2000 Takada et al.  
6,247,916 B1 * 6/2001 Takada ................ B29C 49/6445  
                                                    425/534

(Continued)

FOREIGN PATENT DOCUMENTS

CN   101585229 A   11/2009  
CN   102152467 A   8/2011

(Continued)

OTHER PUBLICATIONS

International Search Report issued in International Patent Application No. PCT/JP2019/025310, dated Oct. 1, 2019, along with an English translation thereof.

(Continued)

*Primary Examiner* — Monica A Huson  
(74) *Attorney, Agent, or Firm* — Greenblum & Bernstein, P.L.C.

(57) ABSTRACT

A molding device suitable for performing at least one of injection molding of preforms and blow molding of the preforms includes a pitch changing device including: N holding units capable of holding the preforms and arranged at a predetermined pitch in a predetermined direction, N being inter equal to or larger than 2; a coupling unit coupling the holding units adjacent to each other such that the pitch is changeable; a drive unit configured to generate a predetermined drive force; and a drive force transmission unit configured to transmit the drive force to each of one end-side and the other end-side, in the predetermined direction, of the coupled N holding units. The one end-side and the other (Continued)

N-ROW DIRECTION end-side are configured to be moved in the predetermined direction by the drive force to change the pitch.

8 Claims, 18 Drawing Sheets

(56) References Cited

U.S. PATENT DOCUMENTS

| | | | |
|---|---|---|---|
| 6,607,375 | B1 | 8/2003 | Takada et al. |
| 2009/0233816 | A1 | 9/2009 | Aoki et al. |
| 2013/0236589 | A1 | 9/2013 | Yamaguchi et al. |
| 2014/0271976 | A1 | 9/2014 | Yamaguchi |
| 2014/0302191 | A1 | 10/2014 | Yamaguchi et al. |
| 2015/0328817 | A1 | 11/2015 | Yamaguchi et al. |
| 2016/0031146 | A1 | 2/2016 | Yamaguchi |
| 2018/0079600 | A1 | 3/2018 | Yumoto |
| 2018/0312345 | A1 | 11/2018 | Yumoto |

FOREIGN PATENT DOCUMENTS

| | | |
|---|---|---|
| CN | 104129065 A | 11/2014 |
| CN | 106584816 A | 4/2017 |
| CN | 107206660 A | 9/2017 |
| CN | 214027159 U | 8/2021 |
| JP | 3816537 B2 | 6/2006 |
| JP | 2013-99941 A | 5/2013 |
| JP | 5563095 B2 | 7/2014 |
| WO | 2016/121948 A1 | 8/2016 |

OTHER PUBLICATIONS

Written Opinion of the International Searching Authority issued in International Application No. PCT/JP2019/025310, dated Oct. 1, 2019.

Office Action issued in the corresponding Indian Patent Application 202127003894 dated Dec. 31, 2021, along with English translation thereof.

Office Action issued in Chinese Patent Application No. 201980056900.9 dated Jun. 14, 2022, along with English Translation thereof.

\* cited by examiner

FIG.5
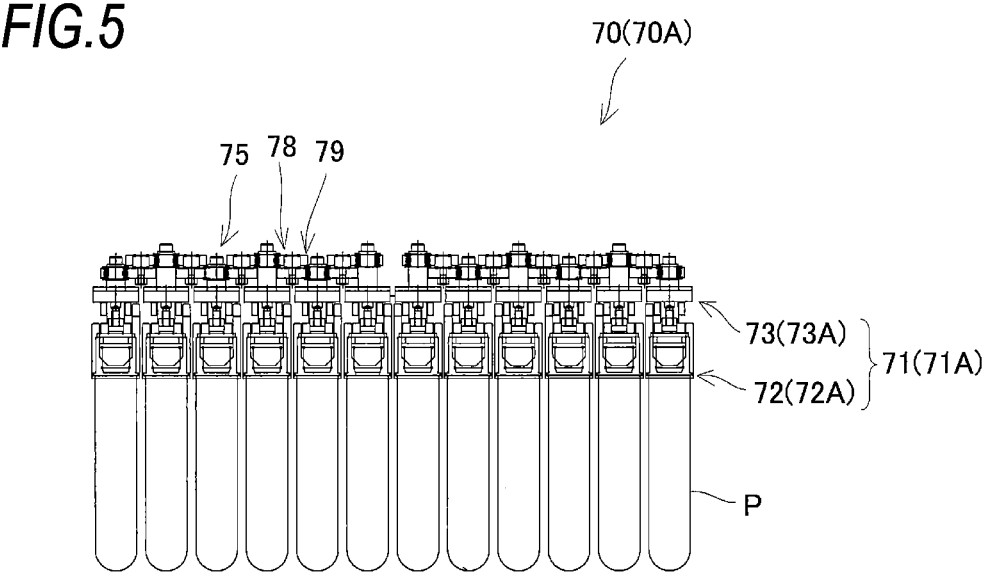
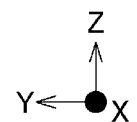

DURING INJECTION MOLDING

70(70A)

DURING PICK-UP
(PITCH CHANGE)

PITCH PATTERN A
↓
PITCH PATTERN C

UPON HEATING

DURING BLOW MOLDING
(PITCH CHANGE)

PITCH PATTERN C
↓
PITCH PATTERN B

DURING INJECTION MOLDING

DURING PICK-UP
(PITCH CHANGE)

PITCH PATTERN A
↓
PITCH PATTERN C

UPON HEATING

DURING BLOW MOLDING
(PITCH CHANGE)

PITCH PATTERN C
↓
PITCH PATTERN B

DURING INJECTION MOLDING

DURING PICK-UP
(PITCH CHANGE)
PITCH PATTERN A
↓
PITCH PATTERN C

UPON HEATING

DURING BLOW MOLDING
(PITCH CHANGE)

PITCH PATTERN C
↓
PITCH PATTERN B

DURING INJECTION MOLDING

DURING PICK-UP (PITCH CHANGE)

PITCH PATTERN A
↓
PITCH PATTERN C

UPON HEATING

DURING BLOW MOLDING
(PITCH CHANGE)

PITCH PATTERN C
↓
PITCH PATTERN B

PITCH CHANGING DEVICE, AND MOLDING DEVICE PROVIDED WITH SAME AND MOLDING METHOD

TECHNICAL FIELD

The present disclosure relates to a pitch changing device, a molding device having the same, and a molding method.

BACKGROUND ART

Molding devices are largely classified into a hot parison method (also referred to as one-stage method) in which an injection molding device and a blow molding device are in an inline state and blow molding is performed using residual heat of an injection-molded preform, and a cold parison method (also referred to as two-stage method) in which an injection molding device and a blow molding device are in an offline state and a preform naturally cooled to about a room temperature is reheated and is blow-molded.

In recent years, suggested is also a molding device of a cool parison method (also referred to as 1.5-stage method) in which an injection molding device and a blow molding device are in an inline state and X (X: an integer equal to or larger than 2) injection-molded preforms are divided into Y operations and Z (Z=X/Y) preforms are blow-molded at a time in each operation (for example, refer to PTL 1).

CITATION LIST

Patent Literature

[PTL 1] Japanese Patent No. 5,563,095

SUMMARY OF INVENTION

Technical Problem

If one molding device in such a type can change each number of X, Y and Z flexibly, it is possible to implement manufacturing of a container more suitable for customer needs, which increases market competitiveness. In order to realize this, it is necessary to make a pitch (distance) between preforms different depending on an aspect of a final molded product, an amount of production thereof, a configuration of a mold thereof and the like, in each process of a process of transferring preforms from a mold for injection molding, a process of conveying the preforms to each unit, a process of transferring the preforms to a mold for blow molding, and the like. For this reason, for such a type of the molding device, it is expected to improve compatibility with the diverse pitches, i.e., versatility.

Note that, there is the above problem in any injection blow molding device of one-stage method, 1.5-stage method and 2-stage method. Also, there is the above problem in any device of the injection molding device and the blow molding device, in addition to the injection blow molding device.

The present disclosure has been made in view of the above situations, and an object thereof is to provide a pitch changing device, a molding device having the same and a molding method capable of addressing diverse pitches between preforms to improve versatility.

Solution to Problem

In order to achieve the above object, one aspect of a molding device in accordance with the present disclosure is a molding device suitable for performing at least one of injection molding of preforms and blow molding of the preforms, the molding device including a pitch changing device including:

N holding units capable of holding the preforms and arranged at a predetermined pitch in a predetermined direction, N being an integer equal to or larger than 2; a coupling unit coupling the holding units adjacent to each other such that the pitch is changeable;

a drive unit configured to generate a predetermined drive force; and a drive force transmission unit configured to transmit the drive force to each of one end-side and the other end-side, in the predetermined direction, of the coupled N holding units, in which the one end-side and the other end-side are configured to be moved in the predetermined direction by the drive force to change the pitch.

Here, n preforms arranged in the predetermined direction are preferably capable of being injection-molded at a time, n being an integer equal to or larger than 2 and equal to or smaller than N.

Also, n preforms are preferably capable of being blow-molded at a time, n being an integer equal to or larger than 2 and equal to or smaller than N.

Preferably, the coupling unit includes rotation parts connected to the holding units so as to be rotatable about the holding units as axis centers, and a shaft member configured to pivotally support the rotation parts adjacent to each other such that the adjacent rotation parts are rotatable.

Preferably, the drive force transmission unit includes a loop member provided around the coupled N holding units and connected to each of the one end-side and the other end-side, and the loop member is configured to be rotated by the drive force to change the pitch.

Preferably, when the loop member and the drive unit are respectively set as a first loop member and a first drive unit, the molding device further includes a second loop member connected to holding units that are adjacent to each other and that constitute a boundary for dividing the N holding units into a group of N1 holding units and a group of N2 holding units, N1 and N2 each being independently an integer equal to or larger than 1 and N1+N2=N, and a second drive unit configured to generate a predetermined drive force, and the second loop member is rotated by the drive force generated from the second drive unit to change the pitch of the adjacent holding units that constitute the boundary.

Preferably, the molding device is an injection blow molding device configured to perform the injection molding and the blow molding.

In order to achieve the above object, one aspect of a pitch changing device in accordance with the present disclosure is a pitch changing device used for a molding device suitable for performing at least one of injection molding of preforms and blow molding of the preforms, the pitch changing device including: N holding units capable of holding the preforms and arranged at a predetermined pitch in a predetermined direction, N being an integer equal to or larger than 2;

a coupling unit coupling the holding units adjacent to each other such that the pitch is changeable;

a drive unit configured to generate a predetermined drive force; and a drive force transmission unit configured to transmit the drive force to each of one end-side and the other end-side, in the predetermined direction, of the coupled N holding units, in which the one end-side and the other end-side are configured to be moved in the predetermined direction by the drive force to change the pitch.

In order to achieve the above object, one aspect of a molding method in accordance with the present disclosure is a molding method suitable for performing at least one of injection molding of preforms and blow molding of the preforms, the molding method including transmitting a drive force to each of one end-side and the other end-side, in a predetermined direction, of one group of holding units where the holding units configured to hold the preforms are coupled so as to be capable of changing a pitch, and moving the one end-side and the other end-side in the predetermined direction by the drive force to change the pitch between the preforms.

Advantageous Effects of Invention

According to the present disclosure, it is possible to address diverse pitches between preforms, thereby improving versatility.

BRIEF DESCRIPTION OF DRAWINGS

FIG. 5 is a side view depicting a configuration example of the pitch changing device in accordance with the first embodiment.

DESCRIPTION OF EMBODIMENTS

Figure 1:
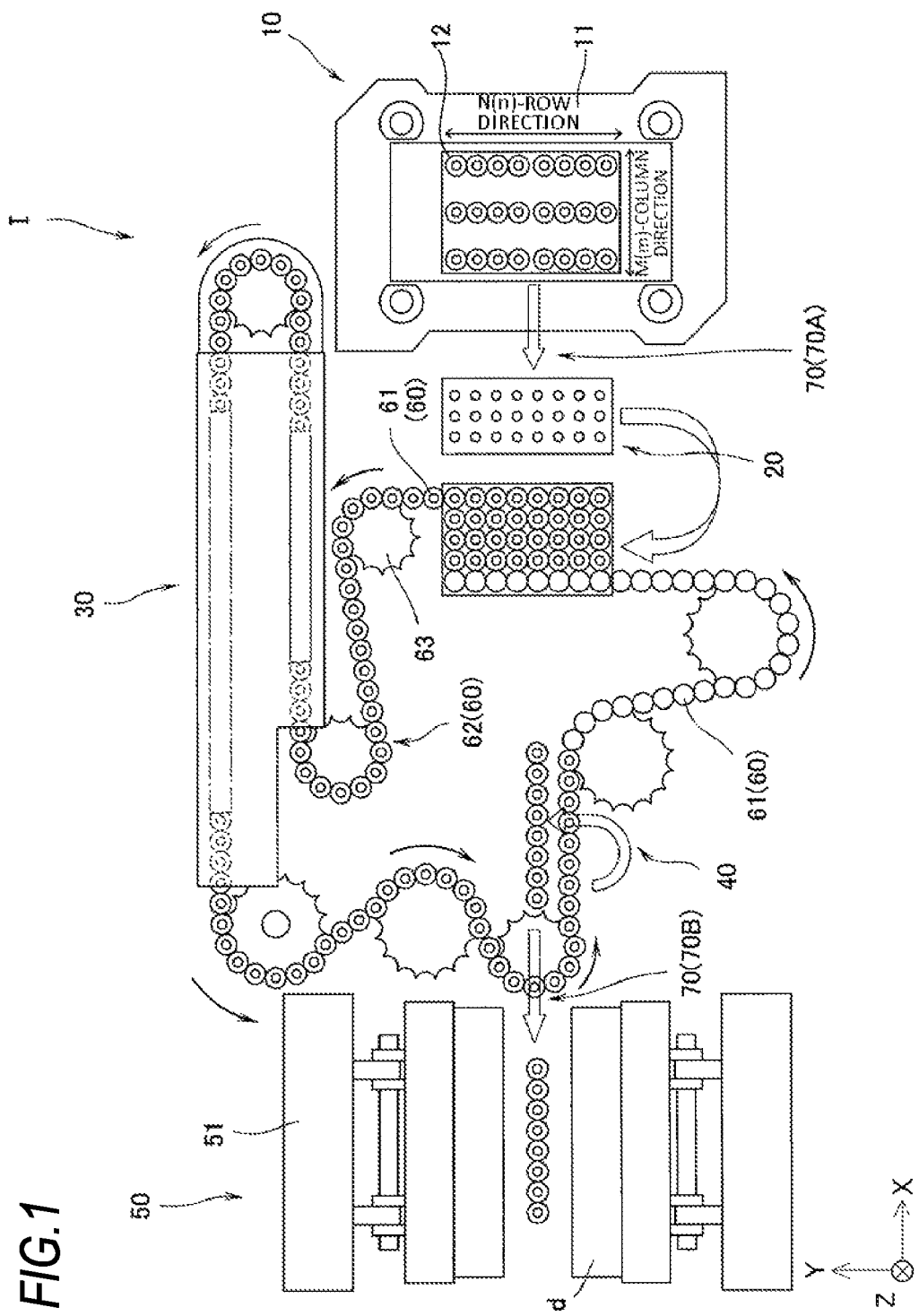
FIG. 1 is an overall view depicting a configuration example of an injection blow molding device in accordance with a first embodiment.

Hereinbelow, embodiments of the present disclosure will be described with reference to the drawings. Like members are denoted with like reference signs, and the descriptions are omitted as appropriate. In the drawings, scales and shapes of the respective parts may be conveniently set in some cases.

First Embodiment

FIG. 1 depicts an example of an overall configuration of an injection blow molding device (molding device I) of a 1.5-stage method. The molding device I includes an injection molding unit 10 (injection molding device), a cooling unit 20, a heating unit 30, a transfer unit 40, a blow molding unit 50 (blow molding device), and a conveying unit 60. Here, the injection molding unit 10 and the blow molding unit 50 each have a pitch changing device 70 (a first pitch changing device 70A of the injection molding unit 10 or a second pitch changing device 70B of the blow molding unit 50) in accordance with the present embodiment. That is, the injection molding unit 10 includes the first pitch changing device 70A, and the blow molding unit 50 includes the second pitch changing device 70B.

Figure 2A:
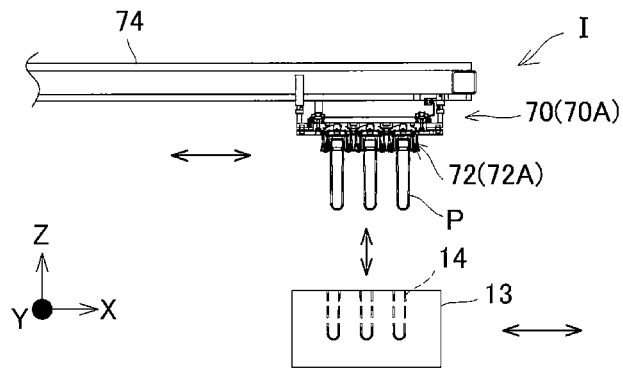
FIG. 2A depicts a configuration example of a first pitch changing device of an injection molding unit in accordance with the first embodiment.
Figure 2B:
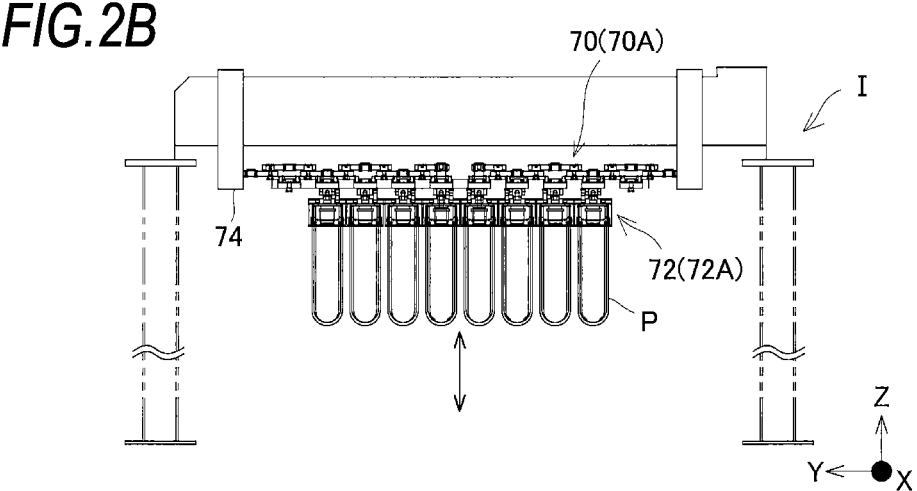
FIG. 2B depicts a configuration example of the first pitch changing device of the injection molding unit in accordance with the first embodiment.
Figure 2C:
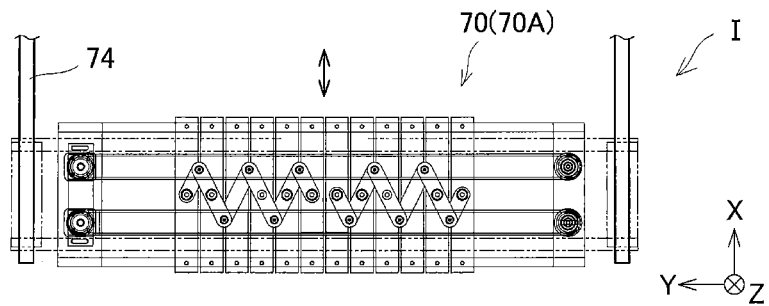
FIG. 2C depicts a configuration example of the first pitch changing device of the injection molding unit in accordance with the first embodiment.
Figure 3:
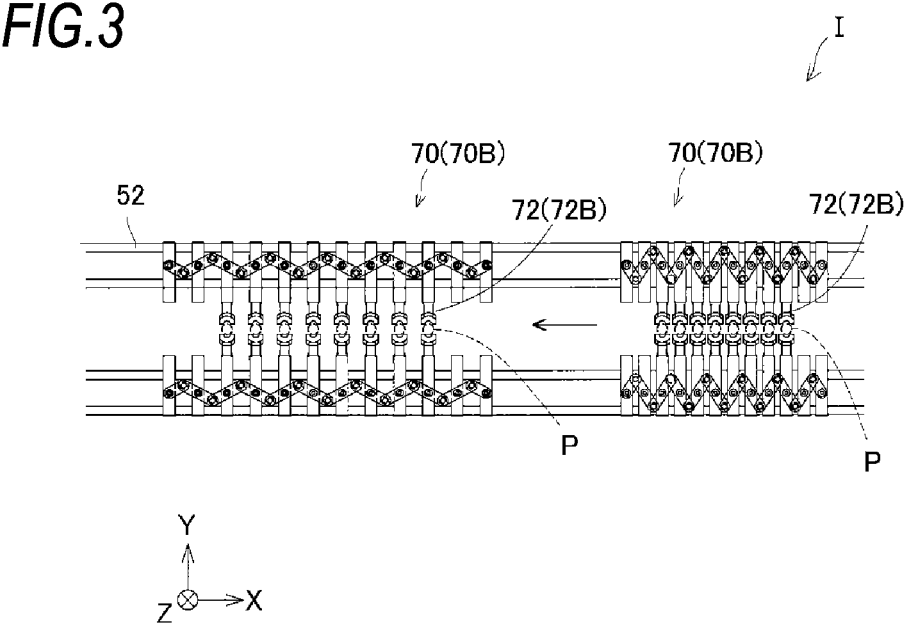
FIG. 3 depicts a configuration example of a second pitch changing device of a blow molding unit in accordance with the first embodiment.
Figure 4:
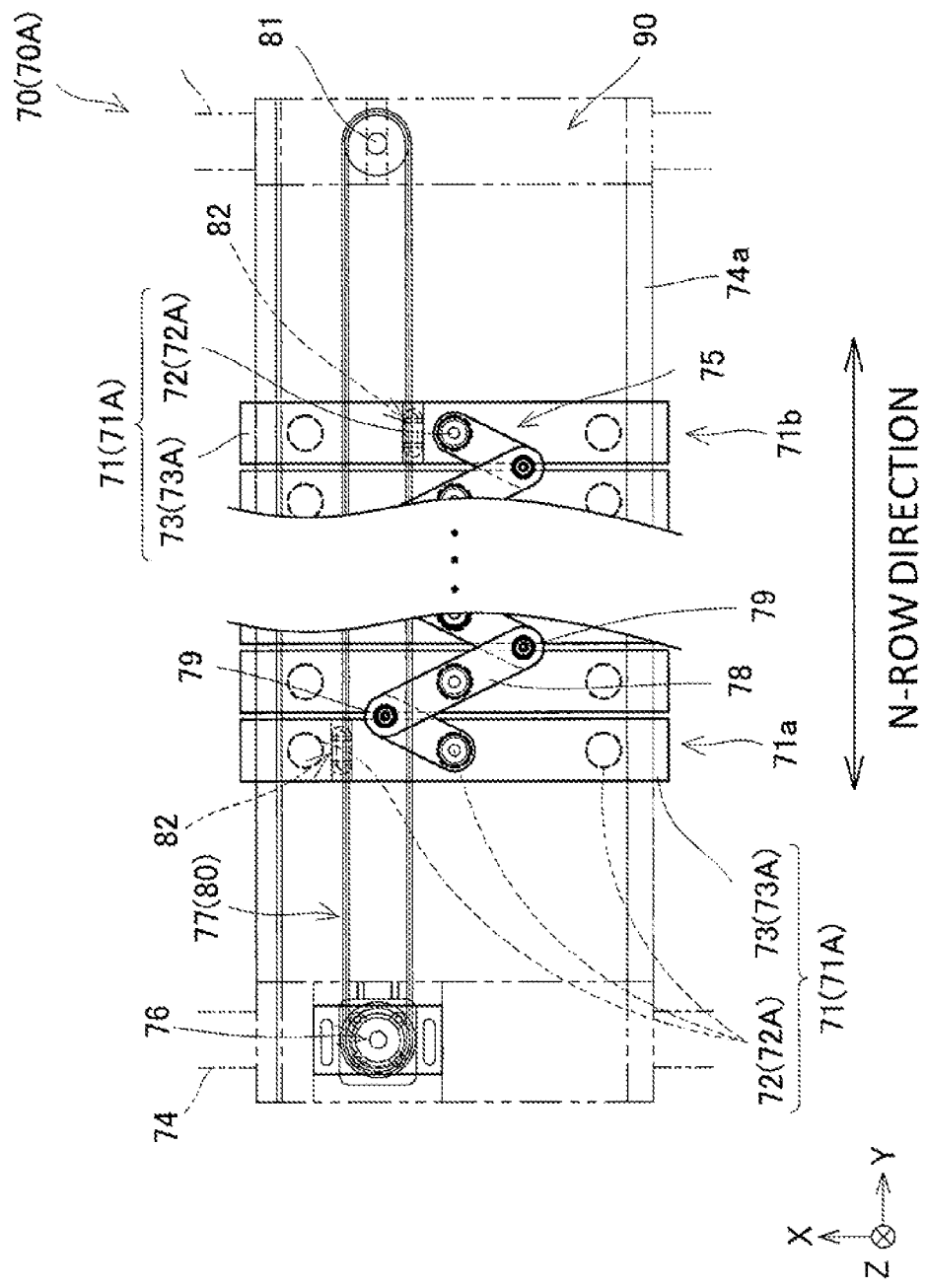
FIG. 4 is a plan view depicting a configuration example of a pitch changing device in accordance with the first embodiment.

FIGS. 2A to 2C depict a specific configuration example and an operation example of the first pitch changing device 70A of the molding device I. FIG. 3 depicts a specific configuration example and an operation example of the second pitch changing device 70B. FIGS. 4 and 5 depict a basic configuration example relating to both the first pitch changing device 70A and the second pitch changing device 70B, particularly, a basic configuration example relating to the first pitch changing device 70A. The present embodiment is described with reference to these drawings.

As shown in FIG. 1, the injection molding unit 10 includes a mold 11 for injection molding (for example, a mold that includes a core mold arranged above and a cavity mold arranged below, which can be mold-clamped each other). A resin material is filled in injection spaces 12 defined by the mold 11 for injection molding, so that bottomed cylindrical preforms P each having one end-side opened (made as a neck part) are injection-molded. The injection spaces 12 are formed by N (an integer equal to or larger than 2) rows at a predetermined pitch in a predetermined direction (N-row direction; the Y-axis direction shown in FIG. 1)×M (an integer equal to or larger than 1) columns at a predetermined pitch in a predetermined direction (M-column direction; the X-axis direction shown in FIG. 1).

The number of the preforms P that are injection-molded at a time may be different depending on an aspect of a final molded product, an amount of production thereof, a configuration of the mold 11 for injection molding, and the like. In the injection molding unit 10, the preforms P of n (n: an integer equal to or larger than 2 and equal to or smaller than N) rows×m (m: an integer equal to or larger than 1 and equal to or smaller than M) columns smaller than N rows×M columns can be injection-molded at a time by changing the mold 11 for injection molding, more specifically, by changing the number of the injection spaces 12 of the mold 11 for injection molding. That is, the injection blow molding device (molding device I) can injection-mold the preforms P of the maximum number of N rows×M columns at a time, and can injection-mold the preforms P of the smaller number of n rows×m columns in some cases.

N rows×M columns is, for example, 8 rows×3 columns. In this case, the maximum 24 preforms P can be injection-molded at a time (N=8, M=3, n=8, m=3). The 12 preforms P may also be injection-molded at a time (N=8, M=3, n=4, m=3) by halving the number of N rows (i.e., 4 rows×3 columns) so as to be smaller than N rows×M columns. By enlarging the injection spaces 12 of one row in the N-row direction, sizes of preforms or bottles and the number of simultaneous moldings can be changed according to uses.

N rows×M columns is, for example, 12 rows×3 columns. In this case, the maximum 36 preforms P can be injection-molded at a time (N=12, M=3, n=12, m=3). As described above, the 18 preforms P may also be injection-molded at a time (N=12, M=3, n=6, m=3) by halving the number of N rows (i.e., 6 rows×3 columns) so as to be smaller than N rows×M columns. However, the numbers of N, M, n and m are not limited to the above. Note that, it is described in the below that the maximum number of the preforms P molded in the molding device I is N rows×M columns and the actual number of the preforms P molded in the molding device I is n rows×m columns.

As shown in FIGS. 2A to 2C, the injection-molded preforms P are transferred from the mold 11 for injection molding to a pot 13 in an upright state where the neck parts are faced upward. The pot 13 is formed with concave parts 14 corresponding to the mold for injection molding. The injection-molded preforms P of n rows×m columns are accommodated in the concave parts 14 of the pot with keeping arrangement of the injection spaces 12 of the mold 11 for injection molding. At this time, the pot 13 is located at a first position. The pot 13 slidable between the first position and a second position for transferring the preforms P to the pitch changing device 70 (first pitch changing device 70A).

The first pitch changing device 70A includes convex parts 72A. The number of convex parts 72A corresponds to n rows×m columns. The convex parts 72A can hold the neck parts of the preforms P. Note that, the convex parts 72A are provided in holding units 71A (refer to FIG. 4) of N rows, which will be described later. That is, in a device where the preforms P of the maximum number of N rows×M columns (=12 rows×3) columns can be injection-molded at a time, when the number of preforms that are actually injection-molded at a time is n rows×m columns(=6 rows×3 columns), the convex parts 72A are six and the holding units 71A are twelve. The convex parts 72A are each provided in the holding units 71A. The first pitch changing device 70A is moved down with respect to the pot 13, so that the convex parts 72A of the holding units 71A grip (hold) the neck parts of the preforms P. Then, the convex parts 72A of the holding units 71A appropriately suck and hold the preforms P, and the first pitch changing device 70A is moved up with respect to the pot 13, so that the preforms P are pulled up from the pot 13. That is, the preforms P of n rows×m columns accommodated in the pot 13 are taken out at a time from the pot 13 slid to the second position by the first pitch changing device 70A with keeping the arrangement.

The first pitch changing device 70A is horizontally moved in the X-axis direction along a rail 74 so as to come close to the cooling unit 20 while getting away from the injection molding unit 10 with holding the preforms P. That is, the preforms P of n rows×m columns taken out from the pot 13 are transferred at the same time to the cooling unit 20 by the first pitch changing device 70A. At this time (i.e., while transferring the preforms P), by the first pitch changing device 70A, the holding units 71A are horizontally moved in the Y-axis direction along a rail 74a, so that a pitch of the preforms P in the N(n)-row direction is changed into a predetermined pitch.

Returning to FIG. 1, the cooling unit 20 is described. The cooling unit 20 receives the preforms P transferred from the first pitch changing device 70A in an upright state, holds the received preforms P, and cools the preforms P to such an extent that the preforms do not reach a room temperature, thereby relaxing non-uniformity in temperature of the preforms. Then, the cooling unit 20 is inverted and lowered while holding the preforms P (i.e., the preforms P are in an inverted state where the neck parts are faced downward), and transfers the preforms P of n rows×m columns to conveying jigs 61 at the same time. Note that, one conveying jig 61 moves in the conveying unit 60 while holding the maximum N preforms P in line. For this reason, when receiving the preforms P from the cooling unit 20, the conveying jigs 61 of at least m columns, preferably M columns stand by aligned immediately below the cooling unit 20.

The conveying jig 61 is provided with convex parts (not shown) for holding the neck parts of the preforms P. The cooling unit 20 is lowered, so that the neck parts of the preforms P are held by the convex parts. The holding state of the preforms P by the cooling unit 20 is released and the cooling unit 20 is moved up with respect to the conveying jig 61, so that the preforms P are transferred to the conveying jig 61.

The heating unit 30 heats the preforms P cooled in the cooling unit 20 to a temperature suitable for blow molding while conveying the preforms P along a conveying line 62. The entire preforms P can be uniformly heated by heating the preforms P in the heating unit 30 while rotating the preforms P. Also, the transfer unit 40 takes out and inverts a predetermined number of (for example, n) preforms P at a time that is heated by the heating unit 30 and that is held in an inverted state, from the conveying jig 61. Note that, this state is referred to as an upright state. The preforms P in the upright state are transferred from the transfer unit 40 to the pitch changing device 70 (second pitch changing device 70B) included in the blow molding unit.

The second pitch changing device 70B has convex parts (chuck parts) 72B (refer to FIG. 3) of n rows×1 column. The convex parts 72B can grip the neck parts of the preforms P. Note that, the convex parts 72B are provided in N holding units 71B (refer to FIG. 6). That is, in a device where the preforms P of the maximum N rows (=12 rows) can be blow-molded at a time, when the preforms of n rows (=6 rows) are taken out at a time from the conveying jigs 61, the convex parts 72B are 6 (six) and the holding units 71B are 12 (twelve). The convex parts 72B are each provided in the holding units 71B. When the transfer unit 40 is moved up with respect to the second pitch changing device 70B, the neck parts of the preforms P are gripped (held) by the convex parts 72B of the holding units 71B. Then, the transfer unit 40 is moved down with respect to the second pitch changing device 70B, so that the preforms P are separated from the transfer unit 40 and the preforms P are thus transferred.

As shown in FIG. 3, the second pitch changing device 70B is configured to slide the preforms P in the X-axis direction along a rail 52 toward a mold 51 for blow molding of the blow molding unit 50 while holding the preforms P (the neck parts of the preforms P) transferred from the transfer unit 40 by the convex parts 72B. At this time (i.e., while sliding the preforms P), a pitch of the preforms P in the N(n)-row direction is changed into a predetermined pitch (a pitch between centers of the blow cavities) by the second pitch changing device 70B (in FIG. 3, for convenience, the second pitch changing device 70B before and after pitch change is shown together).

Returning to FIG. 1, the blow molding unit 50 is configured to blow-mold the preforms P whose pitch in the N(n)-row direction has been changed by the mold 51 for blow molding. Thereby, final molded products are obtained. The final molded products are held on a chuck member for take-out (not shown), and are conveyed to a take-out unit (not shown) along a predetermined rail (i.e., the final molded products are taken out to an outside of the molding device I).

In the blow molding unit 50, for example, the X preforms P to be injection-molded are divided into Y (Y: an integer equal to or larger than 2) operations, and the Z (Z: a natural number, Z=X/Y) preforms can be blow-molded at a time in each operation. As described above, in the cooling unit 20, the injection-molded preforms P are cooled to such an extent that the preforms P do not reach a room temperature. Therefore, when the preforms are divided into Y operations and the Z preforms are blow-molded at a time, it is easy to make a molding temperature difference in each operation small. However, the present disclosure is not necessarily required to include the cooling unit 20 and is not limited to the molding device I of a 1.5-stage method. Note that, in the embodiment of the present disclosure, X corresponds to M×N (m×n), Y corresponds to M (m), and Z corresponds to N (n).

In the injection blow molding device I as described above, the preforms P are conveyed to each unit by the conveying unit 60. The conveying unit 60 includes the plurality of conveying jigs 61 coupled to each other, and drives sprockets 63 in engagement with the conveying jig 61, thereby sequentially conveying the conveying jigs 61 along the conveying line 62. The conveying line 62 includes a pair of conveying rails (an outer conveying rail and an inner conveying rail), and circulates via the cooling unit 20, the heating unit 30 and the transfer unit 40.

That is, the conveying jigs 61 are conveyed from the cooling unit 20 to the heating unit 30 and from the heating unit 30 to the transfer unit 40 along the conveying line 62 while holding the preforms P. Then, the empty conveying jigs 61 after transferring the preforms P to the transfer unit 40 are conveyed from the transfer unit 40 to an initial position (cooling unit 20). Then, the conveying jigs 61 again hold the preforms P, and are conveyed along the conveying line 62 in the similar manner to the above.

Here, in the molding device I, during the injection molding, when the pitches of the injection spaces 12 adjacent to each other in the predetermined direction (for example. the N-row direction) are different, the pitches, in the N-row direction, of the preforms P transferred from the mold 11 for injection molding are correspondingly different. During the injection molding, the pitches of the preforms P may not be constant. For example, when the n preforms P in the N-row direction are sequentially denoted as l1, l2 . . . , a pitch between the $(l+k)^{th}$ and $(l+k+1)^{th}$ preforms may become wider than other pitches during the injection molding in some cases (pitch pattern A).

As an example, there is a case where a central pitch in the N-row direction is wider than the other pitches. In FIG. 1, in a case of N=8, a pitch between the fourth preform and the fifth preform in the N-row direction is wider than pitches between the other preforms adjacent to each other. When injection molding the 12 preforms P in the N-row direction, a pitch between the sixth preform and the seventh preform in the N-row direction may be wider than pitches between the other preforms adjacent to each other.

During the blow molding, the pitch in the N-row direction is required to be set to a pitch that also secures a blow amount (bulge amount) of the preform P (pitch pattern B). As the bulging due to the blow is larger (i.e., the size of the container to be molded is larger), the pitch in the N-row direction is preferably assigned wider.

Further, in order to easily implement downsizing of diverse devices, improvement of productivity per equipment area, and the like, a pitch of the preforms P in the conveying unit 60 (a pitch pattern C, i.e., a pitch of the conveying jigs 61 of the conveying unit 60) may be narrower than the pitch (pitch pattern A) during the injection molding and the pitch (pitch pattern B) of the preforms P during the blow molding, in some cases.

That is, the pitches of the preforms P in the N-row direction may be different depending on an aspect of the final molded product, an amount of production thereof, configurations of the mold 11 for injection molding and the mold 51 for blow molding, and the like. For such a type of the molding device, it is expected to improve compatibility with the diverse pitches, i.e., versatility. In that respect, the injection molding unit 10 and the blow molding unit 50 each have a pitch changing function (pitch changing device 70) of the present embodiment.

As shown in FIGS. 4 and 5, the pitch changing device 70 includes at least N holding units 71 in a predetermined direction (N-row direction). The holding unit 71 can hold the preform P. The holding unit 71 includes convex parts 72 for holding the neck parts of the preform P, and a base part 73 that is a basis for sliding the holding unit 71 along a rail 74a extending in the N-row direction. The rail 74a is fixed to a base plate 90. That is, the N holding units 71 are provided, and the convex parts 72 are provided in at least the N base parts 73 provided on the rail 74a extending in the N-row direction (i.e., the m convex parts 72 are provided in the N base parts 73). In the first pitch changing device 70A, the three convex parts 72 may be provided at equal intervals with respect to a longitudinal direction (X-axis direction) of the base part 73 so that their axis centers are erected from the base part 73. Also, in the second pitch changing device 70B (refer to FIG. 3), one convex part 72 may be provided at an end portion so that its axis center is along the longitudinal direction. In particular, FIGS. 4 and 5 depict an example where the three convex parts 72 provided at equal intervals with respect to the longitudinal direction of the base part 73 are erected from the base part 73.

In the injection molding unit 10, the maximum number of the preforms P in the N-row direction that can be injection-molded at a time is N. Also, in the blow molding unit 50, the maximum number of the preforms P in the N-row direction that can be blow-molded at a time is N. The above numbers are not necessarily required to be the same between the injection molding unit 10 and the blow molding unit 50. Also, the maximum moldable number per one row in the injection molding unit 10 and the maximum moldable number in the blow molding unit 50 are not necessarily required to be N. However, the pitch changing device 70 includes at least the N holding units 71 in the N-row direction, so that it is possible to favorably hold all of the preforms P to be transferred from the mold 11 for injection molding or the preforms P to be conveyed to the mold 51 for blow molding and to change the pitch of the preforms.

The pitch changing device 70 includes a coupling unit 75, a drive unit 76, and a drive force transmission unit 77. The coupling unit 75 couples the holding units 71 adjacent to each other such that the pitch is changeable. The drive unit 76 is configured to generate a predetermined drive force. The drive force transmission unit 77 transmits the drive force to each of one end-side 71a and the other end-side 71b, in the predetermined direction, of the coupled N holding units 71 (i.e., holding unit 71 at the one end-side 71a and holding unit 71 at the other end-side 71b, in the N-row direction, of one group of the coupled holding units 71). In the pitch changing device 70, the one end-side 71a and the other end-side 71b are moved in the N-row direction by the drive force to change the pitch. Note that, FIGS. 4 and 5 depict an example where the coupling unit 75 and the drive unit 76 are provided on a surface of the base part 73 (holding unit 71), where the surface of the base part 73 is opposite to (faces) a surface on which the convex parts 72 are provided.

The pitch changing device 70 includes the coupling unit 75, the drive unit 76 and the drive force transmission unit 77 as described above. Thus, the holding units 71 between the one end-side 71a and the other end-side 71b can be moved without transmitting the drive force to each of the holding units 71 correspondingly by moving the one end-side 71a and the other end-side 71b of one group of the coupled holding units 71 in the N-row direction. Therefore, it is possible to easily change the pitch of the one group of the coupled holding units 71.

The coupling unit 75 is a member such as a link mechanism, and includes rotation parts 78 connected to the holding units 71 (for example, the rotation parts 78 is connected to the convex parts 72 of the holding units 71) so as to be rotatable about one point of the holding unit 71 as an axis center, and a shaft member 79 pivotally supports the rotation parts 78 adjacent to each other such that the adjacent rotation parts are rotatable. Thereby, it is easy to stably rotate the rotation parts 78 about one point of each of the holding units 71 (for example, the one point is a bearing provided in each of the holding units 71) and to stably change the pitch of the one group of the coupled holding units 71.

The rotation part 78 is, for example, a link piece, and has a predetermined through-hole. An outer periphery part of the bearing is inserted into the through-hole, so that the rotation part 78 and the holding unit 71 are connected. However, the connection aspect of the rotation part 78 and the holding unit 71 is not limited to the configuration where the outer periphery part of the bearing is inserted.

The rotation part 78 also has through-holes formed on one end-side and the other end-side thereof, and the shaft member 79 fixed to the holding units 71 is inserted into the through-holes via the bearing in a state where upper and lower surfaces of the adjacent rotation parts 78 are surface-contacted to each other. The rotation parts 78 are arranged such that the rotation part in contact with the upper surface of the rotation part 78 and the rotation part in contact with the lower surface of the rotation part 78 are arranged alternately, when seen in the N-row direction. Thereby, a structural balance is secured, so that it is easy to stably change the pitch of the one group of the coupled holding units 71.

Specifically, an upper surface on one end-side ($(1+k+1)^{th}$-side) of the $(1+k)^{th}$ rotation part 78 in the N-row direction is pivotally supported in contact with a lower surface on the other end-side ($(1+k)^{th}$-side) of the $(1+k+1)^{th}$ rotation part 78, and a lower surface on one end-side ($(1+k+2)^{th}$-side) of the $(1+k+1)^{th}$ rotation part 78 in the N-row direction is pivotally supported in contact with an upper surface on the other end-side ($(1+k+1)^{th}$-side) of the $(1+k+2)^{th}$ rotation part 78. However, the pivotal support aspect of the rotation parts is not limited to the scope of the present disclosure.

In the present embodiment, when the pitch between the holding units 71 becomes narrower (when a distance between the adjacent holding units 71 becomes smaller), an angle between the adjacent rotation parts 78 becomes smaller. Note that, when the pitch between the holding units 71 becomes wider (when the distance between the adjacent holding units 71 becomes larger), the angle between the adjacent rotation parts 78 becomes larger. The N holding units 71 adjacent to each other are all coupled by the coupling unit 75. In this way, in the present embodiment, a so-called one-sided pantograph mechanism is configured by the rotation parts 78 and the shaft member 79, and the pitch in the N-row direction can be changed based on the mechanism. Note that, the coupling unit 75 may also be configured by a link mechanism such as a usual pantograph mechanism, a parallel link mechanism, an X-link mechanism and the like, in addition to the one-sided pantograph mechanism.

For the drive unit 76, a well-known servo motor capable of generating a predetermined drive force can be used. Although the same type of the motor may be used in the first pitch changing device 70A of the injection molding unit 10 and the second pitch changing device 70B of the blow molding unit 50, different motors are preferably used according to the drive force and the drive amount required for the drive unit 76.

The drive force transmission unit 77 includes a loop member 80. The loop member 80 is provided around the coupled N holding units 71 (i.e., around one group of the coupled holding units 71) and is connected to each of the one end-side 71a and the other end-side 71b. In the configuration, rollers 81 in engagement with the loop member 80 guide and rotate the loop member 80 by the drive force generated from the drive unit 76 to change the pitch of the holding units 71 in the N-row direction. In the present embodiment, predetermined connection units 82 are each provided in each of the base part 73 of the holding unit 71 on the one end-side 71a and the base part 73 of the holding unit 71 on the other end-side 71b, and the loop member 80 is connected to the holding units 71 at the connection units 82.

Figure 6:
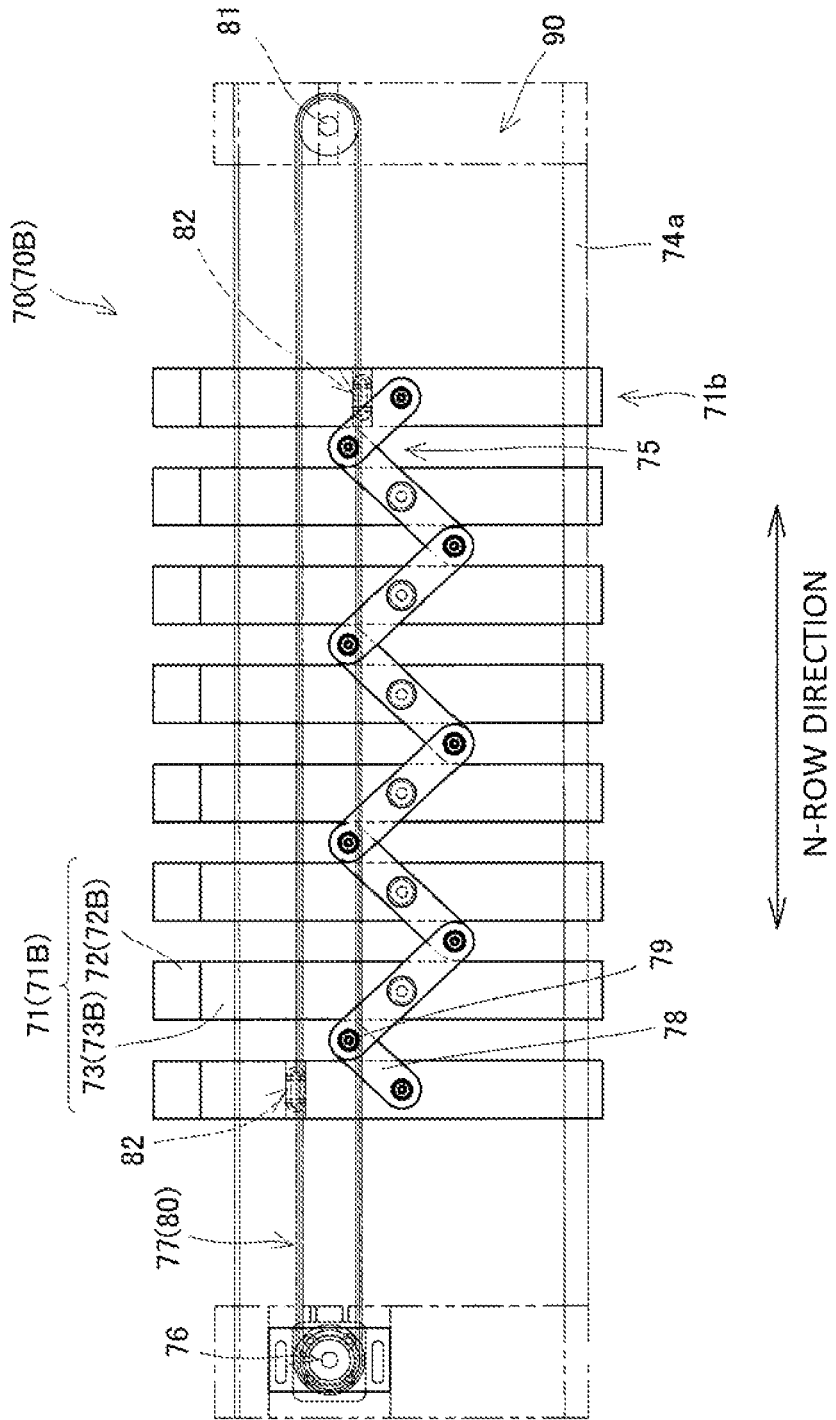
FIG. 6 is a plan view depicting a configuration example of the pitch changing device (N=8) in accordance with the first embodiment.

FIG. 6 depicts an example where the above configuration is applied to the pitch changing device 70 where N=8. The structure shown in FIG. 6 can be easily applied to the second pitch changing device 70B for conveying the preforms P to the mold 51 for blow molding. In FIG. 6, when the loop member 80 is rotated such that the loop member 80 circulates in the predetermined direction, the connection unit 82 connected to the loop member 80 and the one end-side 71a and the connection unit 82 connected to the loop member 80 and the other end-side 71b are away from each other. Thereby, a distance between the one end-side 71a and the other end-side 71b becomes larger, so that the pitches of the six holding units 71 sandwiched between the one end-side 71a and the other end-side 71b and coupled by the coupling unit 75 become correspondingly wider.

Note that, when the loop member 80 is rotated to circulate in an opposite direction to the predetermined direction, the connection unit 82 connected to the loop member 80 and the one end-side 71a and the connection unit 82 connected to the loop member 80 and the other end-side 71b come close to each other. Thereby, the distance between the one end-side 71a and the other end-side 71b becomes smaller, so that the pitches of the six holding units 71 sandwiched between the one end-side 71a and the other end-side 71b and coupled by the coupling unit 75 become correspondingly narrower. By this type of the mechanism, it is possible to change the distance between the one end-side 71a and the other end-side 71b depending on the drive force and the drive amount of the drive unit 76. Thereby, it is easy to arbitrarily change the pitches of the N holding units 71 coupled by the coupling unit 75.

Figure 7:
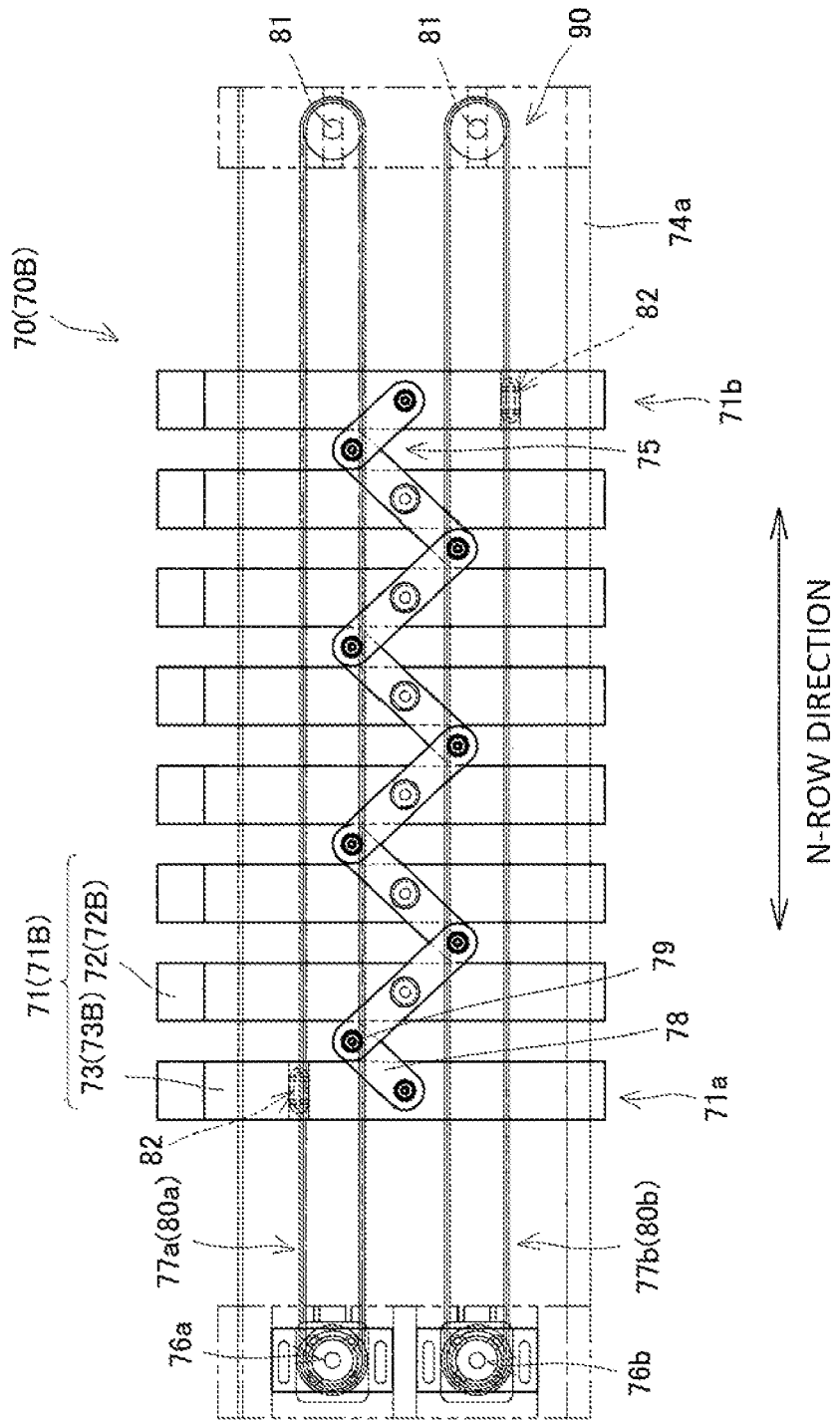
FIG. 7 is a plan view depicting a configuration example of the pitch changing device (N=8) in accordance with the first embodiment.

Here, as shown in FIG. 7, when the drive force transmission unit 77 (loop member 80) and the drive unit 76 are respectively set as a first drive force transmission unit 77a (first loop member 80a) and a first drive unit 76a, the drive force transmission unit 77 (loop member 80) and the drive unit 76 may respectively further include a second drive force transmission unit 77b (second loop member 80b) and a second drive unit 76b. In FIG. 7, while the first loop member 80a is connected to one of the holding unit 71 on the one end-side 71a and the holding unit 71 on the other end-side 71b (for example, the first loop member 80a is connected to the holding unit on the one end-side 71a), the second loop member 80b is connected to the other of the holding unit 71 on the one end-side 71a and the holding unit 71 on the other end-side 71b (for example, the second loop member 80b is connected to the holding unit 71 on the other end-side 71b). Note that, for the basic configuration shown in FIG. 7, the configuration shown in FIG. 6 can be used as appropriate.

In the case of the configuration shown in FIG. 7, the first drive unit 76a is stopped and only the second drive unit 76b is driven, so that only the other end-side 71b is moved in the N-row direction with the one end-side 71a being fixed, thereby changing the pitches of the holding units 71. Also, the second drive unit 76b is stopped and only the first drive unit 76a is driven, so that only the one end-side 71a is moved in the N-row direction with the other end-side 71b being fixed, thereby changing the pitches of the holding units 71. Both the first drive unit 76a and the second drive unit 76b may also be driven. In this way, it is possible to increase variations of implementing the pitch change. When the simultaneous moldable number of the blow molding is different, a phenomenon that a length and a stop position of the conveying jig 61 are slightly different occurs. However, the two types of the drive units of the first drive unit 76a and the second drive unit 76b are provided, so that it is possible to flexibly address the phenomenon because it is possible to change tip end positions upon receiving the preforms P.

Figure 8:
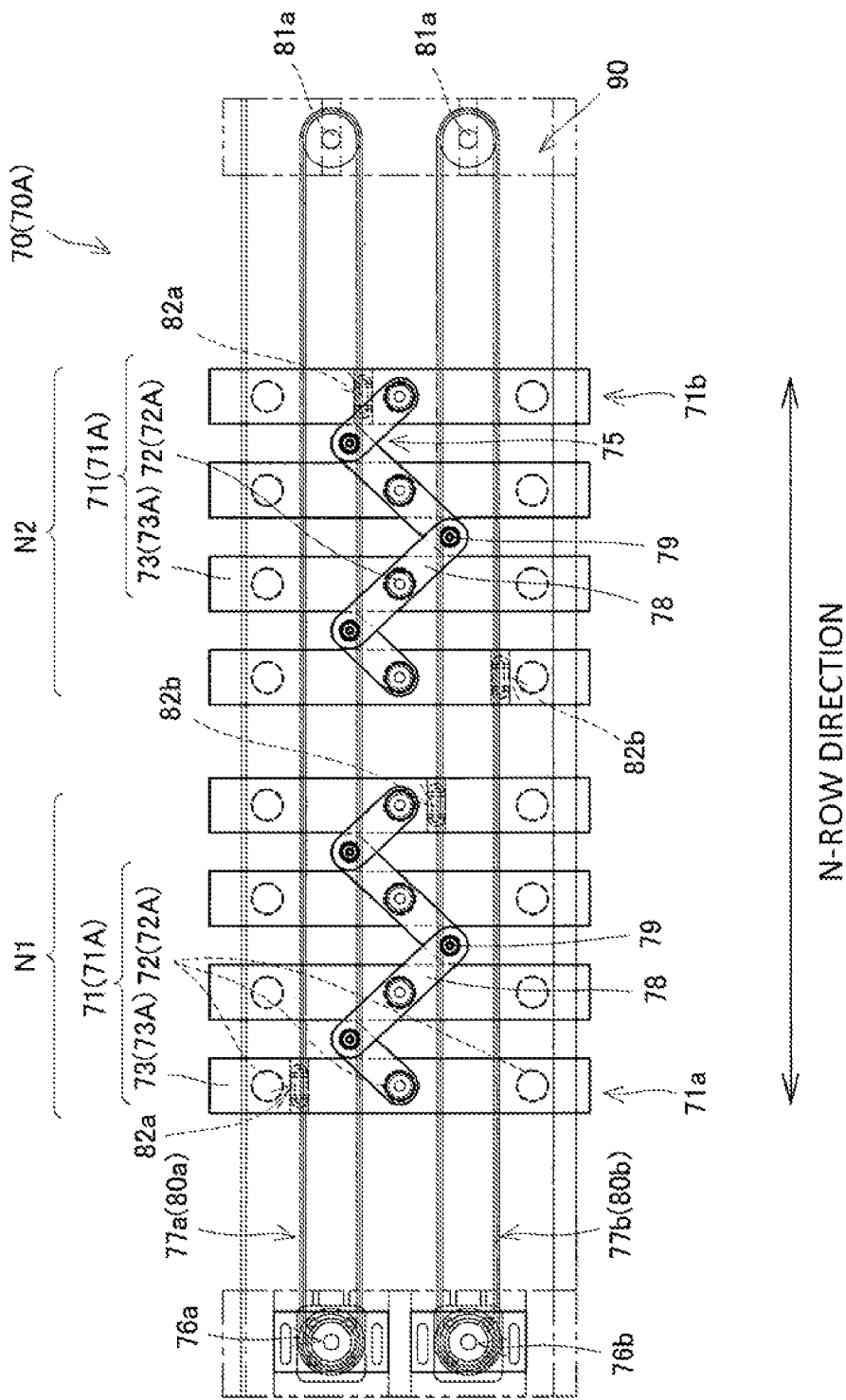
FIG. 8 is a plan view depicting a configuration example of the pitch changing device (N=8) in accordance with the first embodiment.

As an aspect relating to the above (particularly, an aspect that can be easily applied to the first pitch changing device 70A to which the preforms P are conveyed from the mold 11 for injection molding), as shown in FIG. 8, the second loop member 80b may be connected to holding units 71 that are adjacent to each other and that constitute a boundary for dividing the coupled N holding units 71 into a group of N1 holding units and a group of N2 holding units (N1 and N2 each are independently an integer equal to or larger than 1; N1+N2=N). In this aspect, the holding units 71 adjacent to each other, which are the boundaries, are not coupled. That is, the rotation parts 78 of the adjacent holding units 71 that constitute the boundary (i.e., the holding units 71 on the outermost sides of the N1 and the N2 groups), are not pivotally supported by the shaft member 79. The second loop member 80b can be connected to the holding units 71 that are adjacent to each other and that constitute the boundary, at connection units 82b provided in the base parts 73 of the holding units 71 that are the boundaries. Note that, the first loop member 80a is coupled to each of the base parts 73 on the outermost sides of the N1 and the N2 group via the connection units 82a, and can be thus connected to the holding units 71.

In this aspect, when the second loop member 80b is rotated by the drive force generated from the second drive unit 76b, the pitch of the holding units 71 that are adjacent to each other and that constitute the boundary, is changed. According to this configuration, it is possible to further increase the variation of implementing the pitch change, and the pitch (the central pitch in the N-row direction) of the holding units 71 that are adjacent to each other and that are boundary, and another pitch (a pitch defining the entire width of the coupled N holding units 71) can be individually changed.

The example of FIG. 8 depicts a state before pitch change, so as to receive the preforms P from the molding device I and to convey the preforms P to the cooling unit 20. The first pitch changing device 70A includes the coupled eight holding units 71 (N=8, N1=4, N2=4). A pitch between the fourth preform and the fifth holding unit 71 in the N-row direction is wider than pitches between the holding units 71 adjacent to each other. The numbers of N1 and N2 are not limited to the above, and it is also not necessarily required to be N1=N2. When the preforms P are conveyed from the mold 11 for injection molding in a state where the central pitch in the N-row direction is wider than the other pitches, the numbers of N1 and N2 may be changed as appropriate so as to correspond to the pitch.

Figure 9:
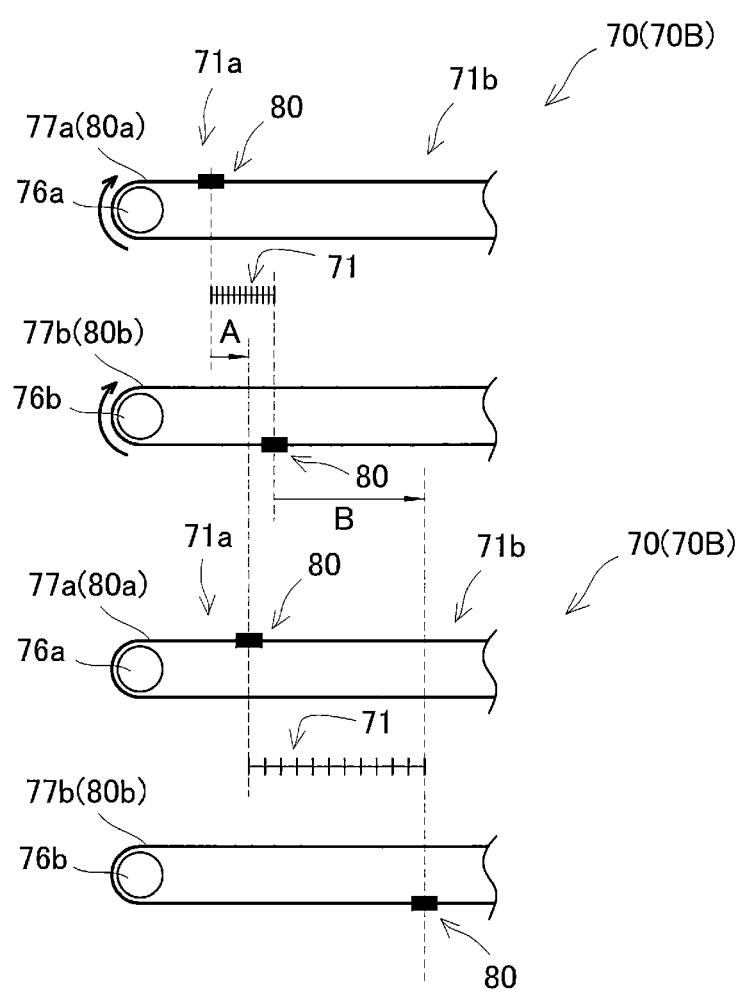
FIG. 9 is a conceptual view depicting an example of a pitch changing method in accordance with the first embodiment.
Figure 10:
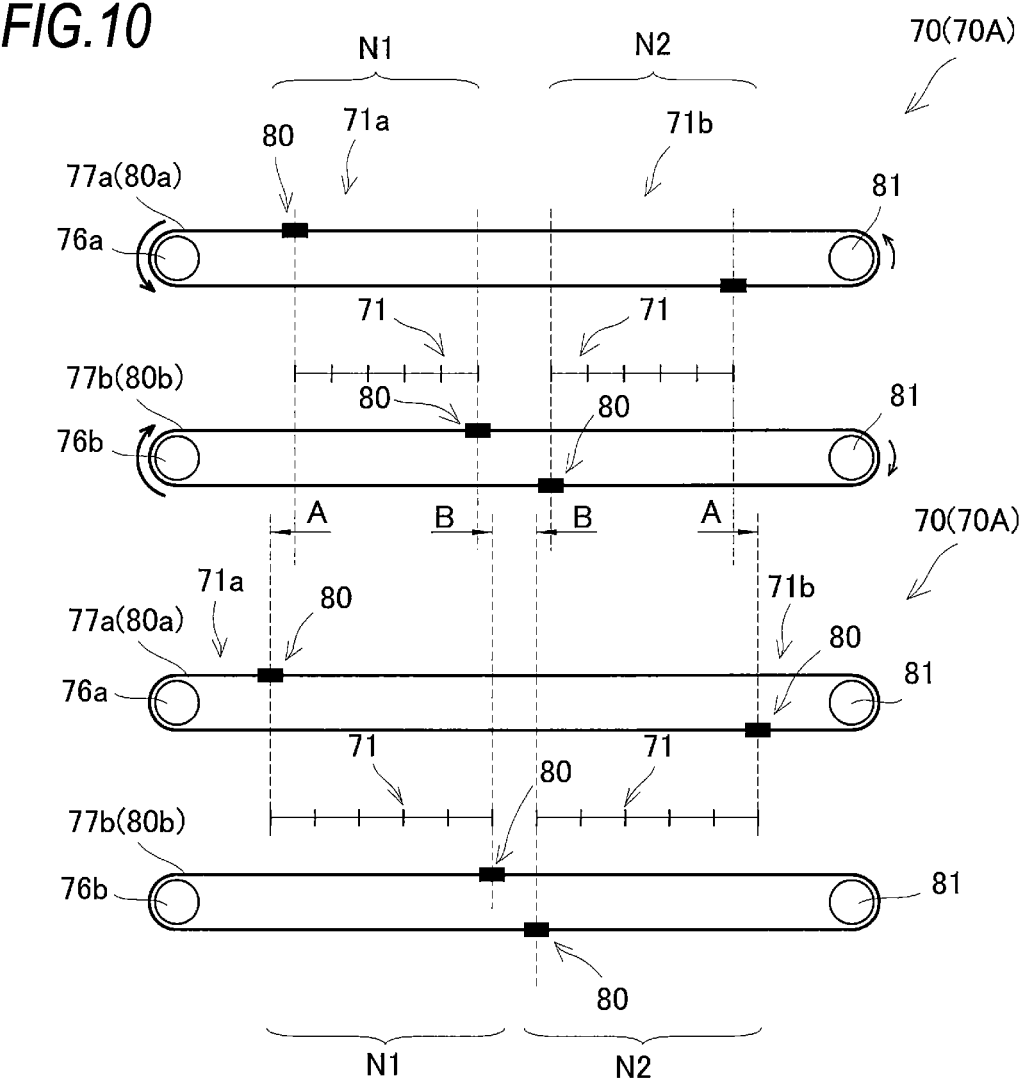
FIG. 10 is a conceptual view depicting an example of the pitch changing method in accordance with the first embodiment.

An example of a pitch changing method based on the above-described pitch change function is described. FIGS. 9 and 10 are conceptual views depicting examples of the pitch changing method. FIG. 9 depicts a pitch changing method (a pitch changing method by the second pitch changing device 70B) that can be easily applied to the blow molding unit 50, and FIG. 10 depicts a pitch changing method (a pitch changing method by the first pitch changing device 70A) that can be easily applied to the injection molding unit 10.

For example, an operation example using the pitch changing device 70 (second pitch changing device 70B) shown in FIG. 7 is shown in FIG. 9. The first drive unit 76a and the second drive unit 76b are each driven to circulate the loop member 80 (80a and 80b) such that the one end-side 71a and the other end-side 71b of the holding units 71 are to move in the same direction (here, the one end-side 71a and the other end-side 71b of the holding units 71 are to move toward the other end-side 71b). Note that, when the drive amounts of the first drive unit 76a and the second drive unit 76b are made different (for example, when the drive amount of the second drive unit 76b is made larger than the drive amount of the first drive unit 76a), the one end-side 71a of the holding units 71 moves toward the other end-side 71b only in a distance A in the N-row direction by the first drive unit 76a but the other end-side 71b of the holding units 71 moves toward the other end-side 71b in a distance B equal to or greater than the distance A in the N-row direction (i.e., distance B>distance A) for a predetermined time.

By doing so, the other end-side 71b of the holding unit 71 more moves by a difference between the relative drive amounts of the first drive unit 76a and the second drive unit 76b, i.e., by a difference between the distance B and the distance A. The other end-side 71b more moves, so that the coupled holding units 71 in the N-row direction correspondingly move and the pitch becomes thus wider.

In this way, during the blow molding, a blow amount (bulging amount) of the preform P can also be secured, and the pitch of the preforms P in the N-row direction can be changed according to an aspect of the final molded product, an amount of production thereof, a configuration of the mold 51 for blow molding, and the like. The pitches of the preforms P can be changed from the pitch pattern C (the two upper figures in FIG. 9) suitable for the pitches (pitches upon heating) of the conveying jigs 61 of the conveying unit 60 to the pitch pattern B (the two lower figures in FIG. 9) suitable for blow molding.

The drive amount of the first drive unit 76a may also be set larger than that of the second drive unit 76b, and the first drive unit 76a and the second drive unit 76b may also be each driven so that the one end-side 71a and the other end-side 71b of the holding units 71 are to move in opposite directions. Even in this configuration, during the blow molding, it is possible to favorably change the pitch of the preforms P in the N-row direction.

An operation example using the pitch changing device 70 (first pitch changing device 70A) shown in FIG. 8 is shown in FIG. 10. The loop member 80 is circulated by driving the first drive unit 76a to move the holding unit 71 on the outermost side of the N1 group toward the one end-side 71a such that the holding unit 71 on the outermost side of the N2 group moves toward the other end-side 71b by the distance A (i.e., such that the holding units 71 on the outermost sides of the N1 group and the N2 group are away from each other). At the same time, the loop member 80 is circulated by driving the second drive unit 76b to move the holding unit 71 on the innermost side of the N1 group toward the other end-side 71b such that the holding unit 71 on the innermost side of the N2 group moves toward the one end-side 71a by the distance B (i.e., such that the holding units 71 on the innermost sides of the N1 group and the N2 group come close to each other). By adjusting the drive amounts of the first drive unit 76a and the second drive unit 76b and correspondingly moving the coupled holding units 71 in the N-row direction, the pitches of the holding units 71 of the N1 group and the N2 group become equal (i.e., the pitches of all the preforms P in the N-row direction can be made equal).

In this way, during the injection molding, it is possible to address the case where the central pitch in the N-row direction becomes wider than the other pitches, and to favorably change the pitches of the preforms P in the N-row direction according to an aspect of the final molded product, an amount of production thereof, a configuration of the mold 11 for injection molding, and the like. The pitches of the preforms P can be changed from the pitch pattern A (the two upper figures in FIG. 10) suitable for the injection molding to the pitch pattern C (the two lower figures in FIG. 10) suitable for the pitches (pitches upon heating) of the conveying jigs 61 of the conveying unit 60. Note that, the N(n)-row directions of the injection molding unit 10 and the blow molding unit 50 may be different. For example, as can be seen from FIG. 1, the N(n)-row direction of the injection molding unit 10 may be set to the Y-axis direction, the N(n)-row direction of the blow molding unit 50 may be set to the X-axis direction, and the N(n)-row directions thereof may be set to be orthogonal to each other.

EXAMPLES

In the below, specific examples of the present disclosure are further described in detail in connection with Examples and with reference to FIGS. 11A to 14D. Note that, in the molding device I, when the maximum moldable number N of one row in the injection molding unit 10 is changed (specifically, when the row patterns of N=8 and N=12 are changed), the maximum holdable number N of the preforms P on the conveying jig 61 is also changed (changed to the specification of N=8 or N=12). However, since the basic configuration and length of the conveying jig 61 leave unchanged, a work load for setup change is small. Note that, in FIGS. 11A to 14B, the circles shown in the pitch patterns A and C indicate pictorial arrangements of sections of the preforms, and the circles shown in the pitch pattern B indicate a pictorial arrangement of sections of containers. FIGS. 11A to 11D show an example where the maximum 24 preforms P of 8 rows×3 columns are injection-molded at a time, and FIGS. 12A to 12D show an example where the maximum 12 preforms P of 4 rows×3 columns are injection-molded at a time in the same manner. In FIGS. 11A to 11D and FIGS. 12A to 12D, the conveying jigs 61 having the same configuration and length (for example, 480 mm) are used.

Figure 11A:
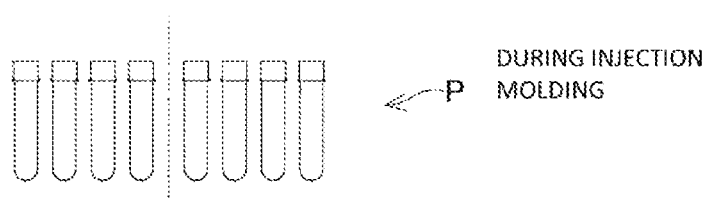
FIG. 11A illustrates an example of pitch change between preforms obtained in 8 rows×3 columns.
Figure 11B:
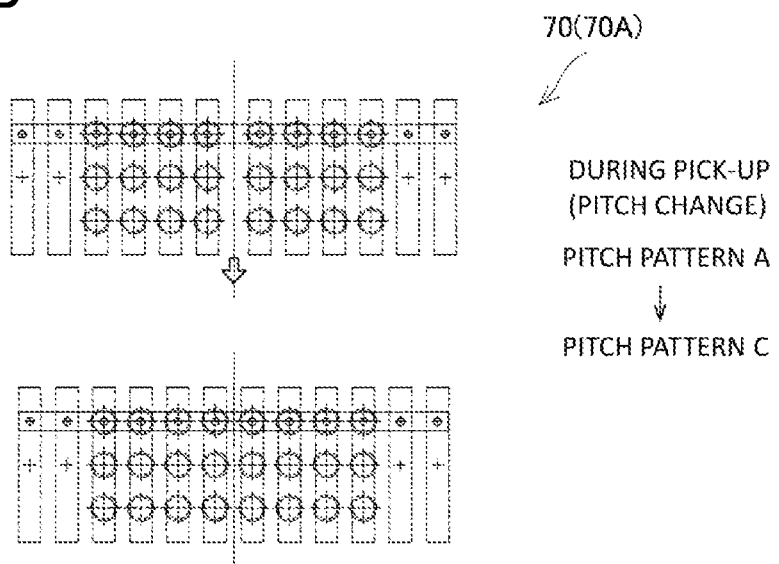
FIG. 11B illustrates an example of pitch change between preforms obtained in 8 rows×3 columns.
Figure 11C:
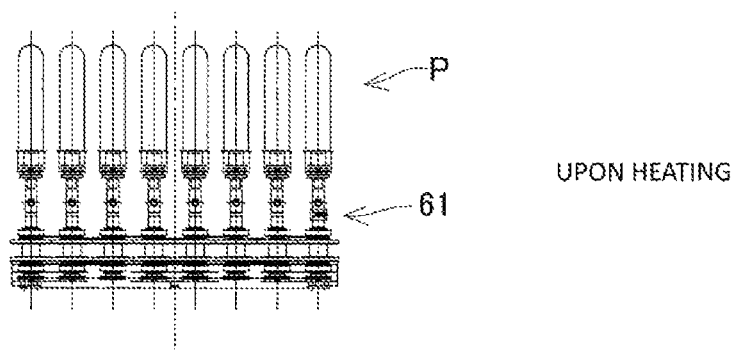
FIG. 11C illustrates an example of pitch change between preforms obtained in 8 rows×3 columns.
Figure 12A:
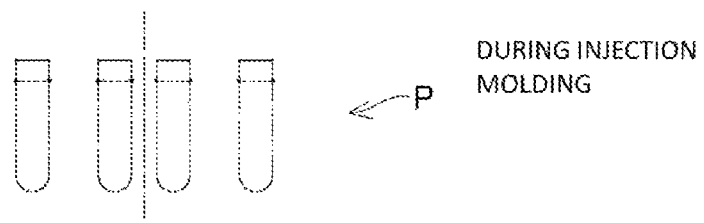
FIG. 12A illustrates an example of pitch change between preforms obtained in 4 rows×3 columns.
Figure 12B:
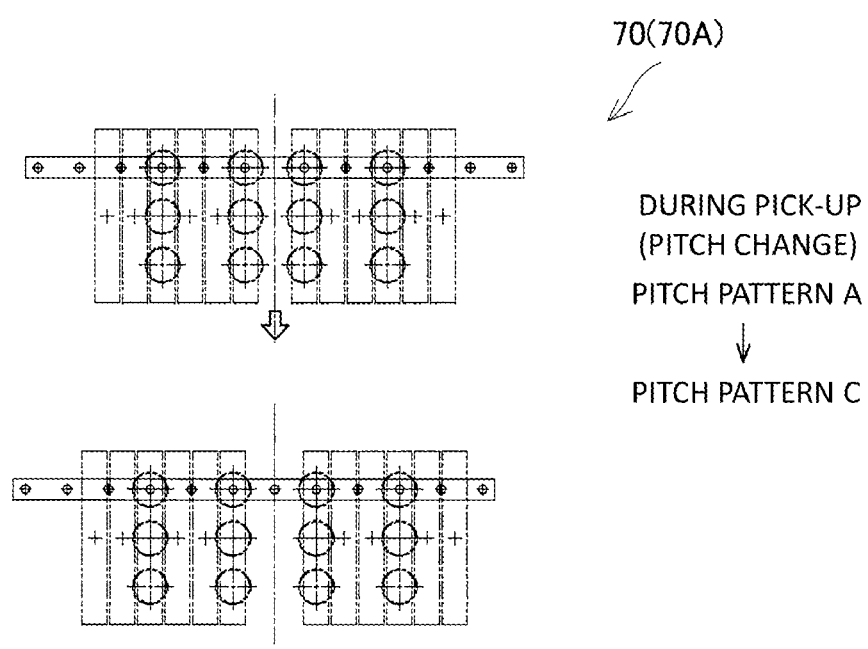
FIG. 12B illustrates an example of pitch change between preforms obtained in 4 rows×3 columns.
Figure 12C:
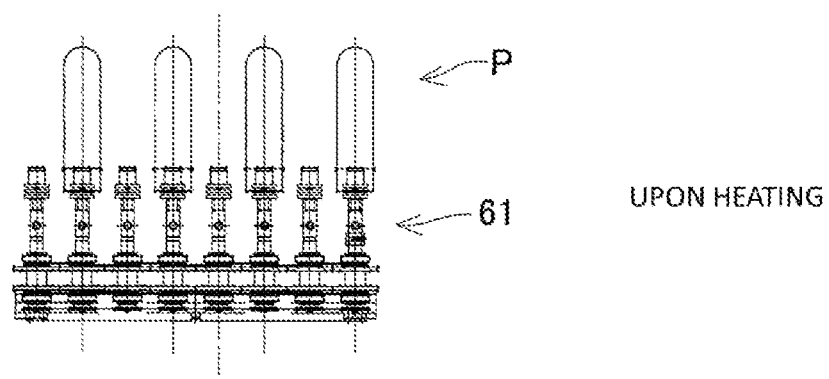
FIG. 12C illustrates an example of pitch change between preforms obtained in 4 rows×3 columns.

During the injection molding, as for the pitches of the preforms P, the central pitch is wider than the other pitches (FIG. 11A and FIG. 12A). While holding the preforms P of N rows×M columns at a time by the first pitch changing device 70A and conveying the preforms P to the cooling unit, the pitches in the N-row direction are made equal (FIG. 11B and FIG. 12B). In the example of FIG. 11C, the conveying jigs 61 of the conveying unit 60 are all used, and in the example of FIG. 12C, the conveying jigs 61 of the conveying unit 60 are used every other one.

Figure 11D:
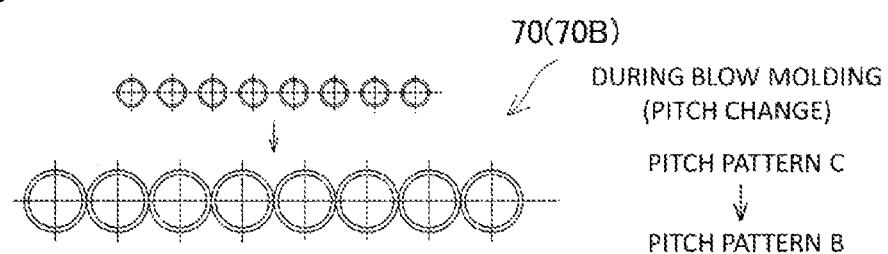
FIG. 11D illustrates an example of pitch change between preforms obtained in 8 rows×3 columns.
Figure 12D:
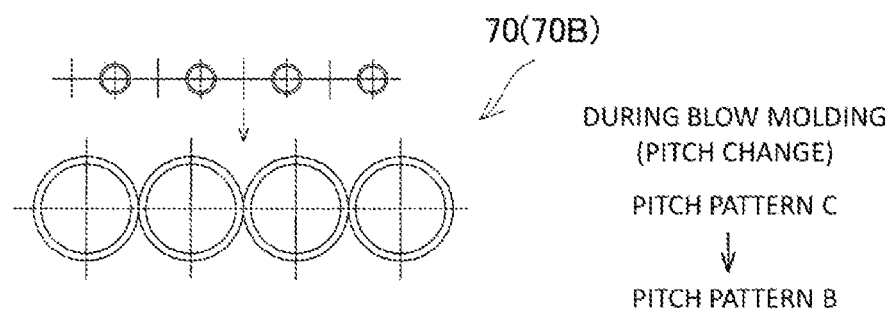
FIG. 12D illustrates an example of pitch change between preforms obtained in 4 rows×3 columns.

Thereafter, while conveying the preforms P to the mold 51 for blow molding by the second pitch changing device 70B having received the preforms P, the pitches are changed into equal pitches suitable for blow molding. Since such pitches also secure a blow amount (bulge amount) of the preform P, the pitches are wider than pitches suitable for the pitches (pitches upon heating) of the conveying jigs 61 of the conveying unit 60 (FIG. 11D and FIG. 12D). In the example of FIGS. 12A to 12D, the number of the preforms P in the N-row direction is smaller than the example of FIGS. 11A to 11D, so that it is easier to obtain a larger (larger diameter) molded product.

Similarly, FIGS. 13A to 13D show an example where the maximum 36 preforms P of 12 rows×3 columns are injection-molded at a time, and FIGS. 14A to 14D show an example where the maximum 18 preforms P of 6 rows×3 columns are injection-molded at a time in the same manner. In FIGS. 13A to 13D and FIGS. 14A to 14D, the conveying jigs 61 having the same configuration and length (for example, 480 mm) are used.

Figure 13A:
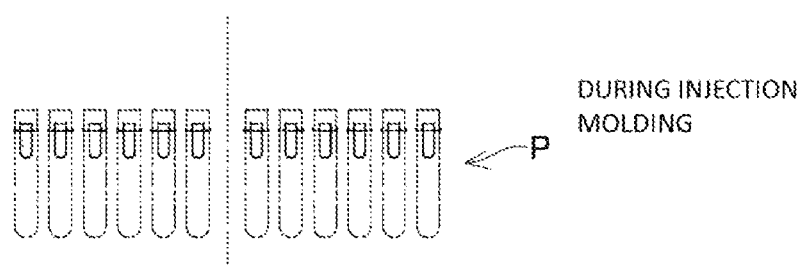
FIG. 13A illustrates an example of pitch change between preforms obtained in 12 rows×3 columns.
Figure 13B:
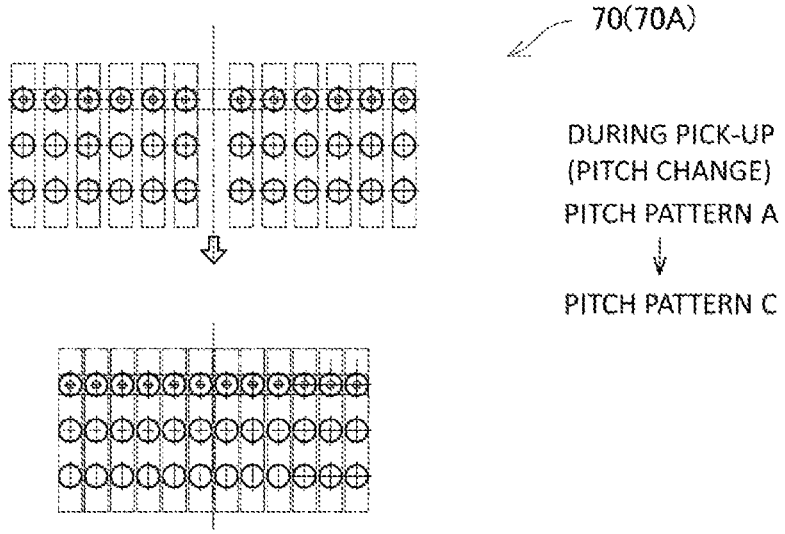
FIG. 13B illustrates an example of pitch change between preforms obtained in 12 rows×3 columns.
Figure 13C:
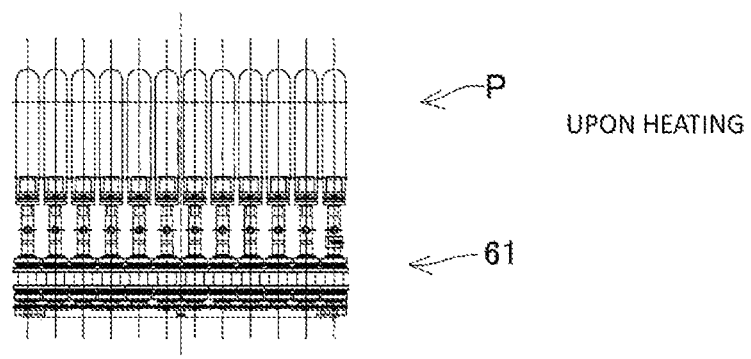
FIG. 13C illustrates an example of pitch change between preforms obtained in 12 rows×3 columns.
Figure 14A:
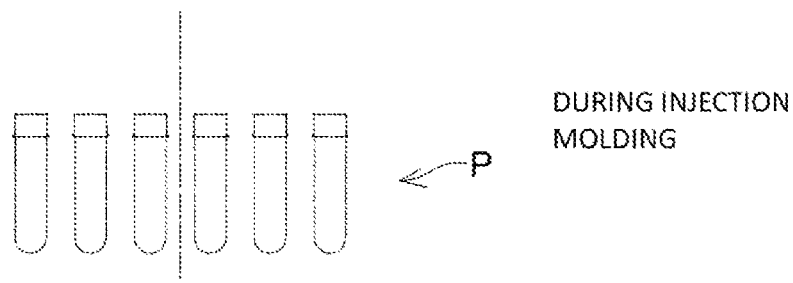
FIG. 14A illustrates an example of pitch change between preforms obtained in 6 rows×3 columns.
Figure 14B:
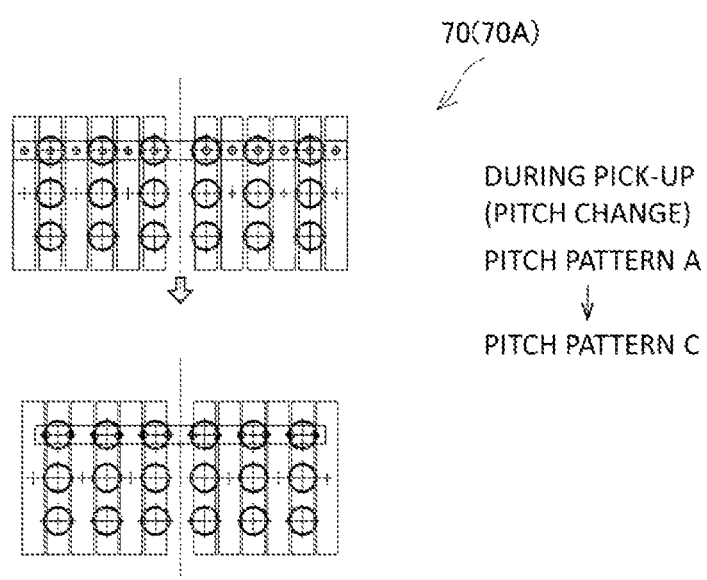
FIG. 14B illustrates an example of pitch change between preforms obtained in 6 rows×3 columns.
Figure 14C:
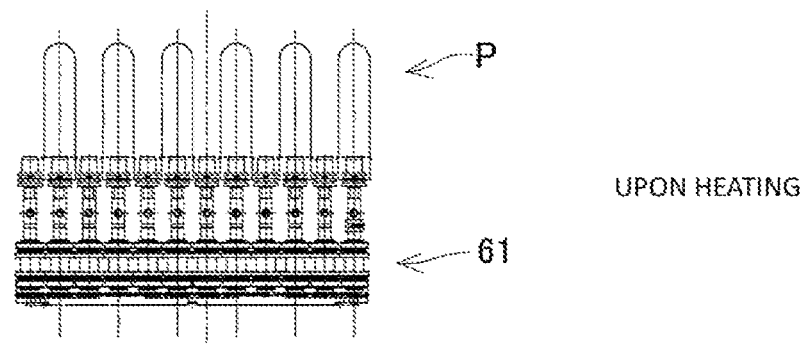
FIG. 14C illustrates an example of pitch change between preforms obtained in 6 rows×3 columns.

During the injection molding, as for the pitches of the preforms P, the central pitch is wider than the other pitches (FIG. 13A and FIG. 14A). While holding the preforms P of N rows×M columns at a time by the first pitch changing device 70A and conveying the same to the cooling unit, the pitches in the N-row direction are made equal (FIG. 13B and FIG. 14B). In the example of FIG. 13C, the conveying jigs 61 of the conveying unit 60 are all used. In the example of FIG. 14C, the conveying jigs 61 of the conveying unit 60 are used every other one.

Figure 13D:
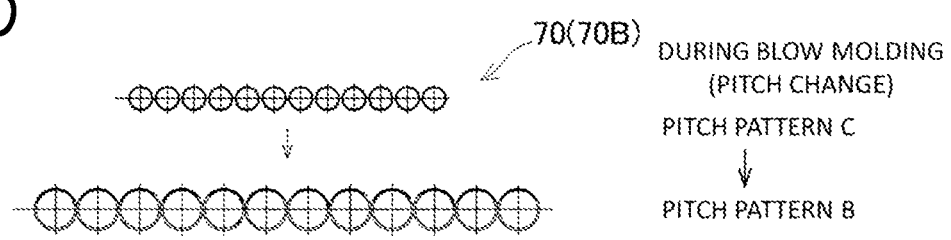
FIG. 13D illustrates an example of pitch change between preforms obtained in 12 rows×3 columns.
Figure 14D:
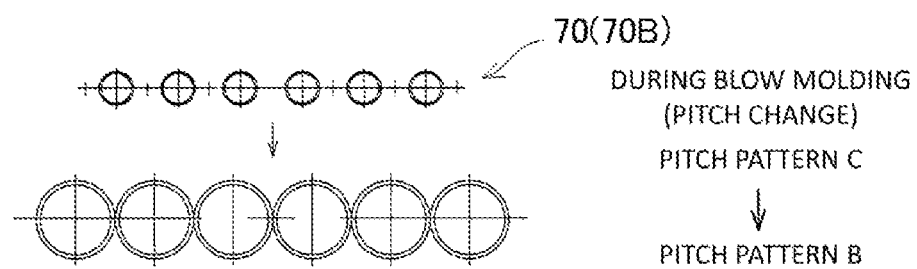
FIG. 14D illustrates an example of pitch change between preforms obtained in 6 rows×3 columns.

Thereafter, while conveying the preforms P to the mold 51 for blow molding by the second pitch changing device 70B having received the preforms P, the pitches are changed into equal pitches suitable for blow molding. Since such pitches also secure a blow amount (bulge amount) of the preform P, the pitches are wider than pitches suitable for the pitches (pitches upon heating) of the conveying jigs 61 of the conveying unit 60 (FIG. 13D and FIG. 14D). In the example of FIGS. 14A to 14D, the number of the preforms P in the N-row direction is smaller than the example of FIGS. 13A to 13D, so that it is easier to obtain a larger (larger diameter) molded product.

OTHER EMBODIMENTS

Although the embodiment of the pitch changing device, the molding device having the same and the molding method in accordance with the present disclosure has been described, the present disclosure is not limited to the embodiment. The present disclosure can be applied to any of an injection molding device configured to perform injection molding, a blow molding device configured to perform blow molding, and an injection blow molding device configured to perform both injection molding and blow molding. Also, when applied to the injection blow molding device, the present disclosure can be applied to any device of one-stage method, a 1.5-stage method and a 2-stage method.

The present application is based on Japanese Patent Application No. 2018-125212 filed on Jun. 29, 2018, the contents of which are incorporated herein as appropriate.

The invention claimed is:

1. A molding device suitable for performing at least one of injection molding of preforms and blow molding of the preforms, the molding device comprising:
   a pitch changing device including:
   N holding units capable of holding the preforms and arranged at a predetermined pitch in a predetermined direction, N being an integer equal to or larger than 2;
   a coupling unit coupling the holding units adjacent to each other such that the pitch is changeable;
   a drive unit configured to generate a predetermined drive force; and
   a drive force transmission unit configured to transmit the drive force to each of one end-side and the other end-side, in the predetermined direction, of the coupled N holding units,
   wherein the one end-side and the other end-side are configured to be moved in the predetermined direction by the drive force to change the pitch,
   wherein the drive force transmission unit includes a loop member provided around the coupled N holding units and connected to each of the one end-side and the other end-side, and
   wherein the loop member is configured to be rotated by the drive force to change the pitch.

2. The molding device according to claim 1,
   wherein n preforms arranged in the predetermined direction are capable of being injection-molded at a time, n being an integer equal to or larger than 2 and equal to or smaller than N.

3. The molding device according to claim 1,
   wherein n preforms are capable of being blow-molded at a time, n being an integer equal to or larger than 2 and equal to or smaller than N.

4. The molding device according to claim 1,
   wherein the coupling unit includes:
   rotation parts connected to the holding units so as to be rotatable about the holding units as axis centers; and
   a shaft member configured to pivotally support the rotation parts adjacent to each other such that the adjacent rotation parts are rotatable.

5. The molding device according to claim 1,
   wherein, when the loop member and the drive unit are respectively set as a first loop member and a first drive unit, the molding device further includes:
   a second loop member connected to holding units that are adjacent to each other and that constitute a boundary for dividing the N holding units into a group of N1 holding units and a group of N2 holding units, N1 and N2 each being independently an integer equal to or larger than 1 and N1+N2=N; and
   a second drive unit configured to generate a predetermined drive force, and
   wherein the second loop member is rotated by the drive force generated from the second drive unit to change the pitch of the adjacent holding units constituting the boundary.

6. The molding device according to claim 1,
   wherein the molding device is an injection blow molding device configured to perform the injection molding and the blow molding.

7. A pitch changing device used for a molding device suitable for performing at least one of injection molding of preforms and blow molding of the preforms, the pitch changing device comprising:
   N holding units capable of holding the preforms and arranged at a predetermined pitch in a predetermined direction, N being an integer equal to or larger than 2;
   a coupling unit coupling the holding units adjacent to each other such that the pitch is changeable;
   a drive unit configured to generate a predetermined drive force; and
   a drive force transmission unit configured to transmit the drive force to each of one end-side and the other end-side, in the predetermined direction, of the coupled N holding units,
   wherein the one end-side and the other end-side are configured to be moved in the predetermined direction by the drive force to change the pitch,
   wherein the drive force transmission unit includes a loop member provided around the coupled N holding units and connected to each of the one end-side and the other end-side, and
   wherein the loop member is configured to be rotated by the drive force to change the pitch.

8. A molding method suitable for performing at least one of injection molding of preforms and blow molding of the preforms, the molding method comprising:
   transmitting a drive force to each of one end-side and the other end-side, in a predetermined direction, of one group of holding units where the holding units configured to hold the preforms are coupled so as to be capable of changing a pitch, and moving the one end-side and the other end-side in the predetermined direction by the drive force to change the pitch between the preforms, wherein a drive force transmission unit for transmitting the drive force includes a loop member provided around the coupled holding units and connected to each of the one end-side and the other end-side, and wherein the loop member is rotated by the drive force to change the pitch.

\* \* \* \* \*